US006793236B1

(12) United States Patent
Mitchell

(10) Patent No.: US 6,793,236 B1
(45) Date of Patent: Sep. 21, 2004

(54) MOTORIZED GAME CART

(76) Inventor: Ervin A. Mitchell, P.O. Box 1394, Glendive, MT (US) 59330

( * ) Notice: Subject to any disclaimer, the term of this patent is extended or adjusted under 35 U.S.C. 154(b) by 61 days.

(21) Appl. No.: 10/280,728

(22) Filed: Oct. 25, 2002

Related U.S. Application Data

(60) Provisional application No. 60/334,782, filed on Oct. 26, 2001.

(51) Int. Cl.[7] .................................................. B62B 1/00
(52) U.S. Cl. ................. 280/652; 280/47.24; 280/47.34; 180/2.1
(58) Field of Search ........................... 280/43.1, 38, 40, 280/63, 47.34, 47.35, 47.24, 651, 652; 180/2.1, 8.1, 81, 343

(56) References Cited

U.S. PATENT DOCUMENTS

| | | | | |
|---|---|---|---|---|
| 2,992,834 A | * | 7/1961 | Tidwell et al. ............. | 280/47.3 |
| 3,073,614 A | * | 1/1963 | Zinneman .................... | 280/30 |
| 3,713,501 A | * | 1/1973 | Hurt ........................... | 180/9.22 |
| 3,731,758 A | | 5/1973 | Hibma | |
| 4,027,889 A | * | 6/1977 | Krofchalk et al. ......... | 280/5.22 |
| 4,033,421 A | * | 7/1977 | Ikarimoto ................... | 280/5.22 |
| 4,215,877 A | * | 8/1980 | Pritchett .................... | 280/652 |
| 4,280,578 A | | 7/1981 | Perkins | |
| 4,441,848 A | * | 4/1984 | Bailey ........................ | 414/439 |
| 4,915,185 A | * | 4/1990 | Olson ......................... | 180/19.2 |
| 5,564,720 A | * | 10/1996 | Stringer ..................... | 280/30 |
| 5,685,385 A | | 11/1997 | Sanuga | |
| D424,266 S | | 5/2000 | McIntyre | |
| 6,062,328 A | * | 5/2000 | Campbell et al. .......... | 180/65.6 |
| 6,123,162 A | * | 9/2000 | Rodriguez et al. .......... | 180/8.3 |
| 6,129,166 A | | 10/2000 | Sueshige et al. | |
| 6,139,029 A | | 10/2000 | Shaw | |
| 6,260,864 B1 | * | 7/2001 | Smith ........................ | 280/47.26 |
| 6,283,496 B1 | | 9/2001 | Dickmann | |
| 6,419,244 B2 | * | 7/2002 | Meabon ..................... | 280/47.27 |
| 6,533,067 B2 | * | 3/2003 | Chick .......................... | 182/16 |
| 6,536,709 B1 | * | 3/2003 | McVaugh ................... | 244/114 R |
| 6,604,707 B2 | * | 8/2003 | McVaugh .................... | 244/50 |
| 2003/0205885 A1 | * | 11/2003 | Woods ........................ | 280/652 |

* cited by examiner

*Primary Examiner*—Brian L. Johnson
*Assistant Examiner*—Kelly E Campbell
(74) *Attorney, Agent, or Firm*—Richard C. Conover

(57) ABSTRACT

A motorized game cart having a frame with wheels mounted to an axle. A portable power drill is mounted to the frame with the chuck of the power drill mounted to a gear box connected to the axle for rotating the axle when the power drill is operated. A drive sprocket is fixedly mounted to a ball bearing assembly mounted for free rotation about the axle. The ball bearing assembly further having a female portion of a socket coupler. A male portion of the socket coupler is secured to the axle to rotate with the axle but is movable longitudinally along the axle. A control rod is provided for moving the male portion into coupling relation with the female portion. A follower sprocket is mounted on a differential mounted to the axle between the two wheels. An endless chain connects the drive sprocket with the follower sprocket.

2 Claims, 9 Drawing Sheets

(8 of 9 Drawing Sheet(s) Filed in Color)

MOTORIZED GAME CART

This Application claims benefit of 60/334,782, filed Oct. 26, 2001.

BACKGROUND OF INVENTION

The present invention relates to a motorized game cart which can be used, for example, by hunters to easily move game carcasses out of the wilderness.

A need exists for a cart device which can be used for transporting game carcasses through uneven terrain. Several devices are known describing game transporting systems such as U.S. Pat. No. 6,260,864 to Smith and U.S. Pat. No. 6,283,496 to Dickmann. Moving game carcasses, however, with manual pull-type carts is tiring and older persons, for example, have difficulty moving a carcass out of the wilderness.

A need exists therefore, for a motorized game cart which is powered with a portable motor allowing a hunter to easily move a game carcass with ease and comfort.

SUMMARY OF INVENTION

The present invention includes a frame upon which the game carcass may be placed. A pair of wheels are secured to an axle across the frame with the axle mounted in pillow block bearings mounted to the frame on opposite sides of the frame. A portable power drill is mounted to the frame with the chuck of the power drill mounted to an input assembly of a gear box. The output assembly of the gear box is mounted to the axle for rotating the axle when the power drill is operated. A ball bearing assembly is rotatably mounted on the axle for free rotation about the axle, and a drive sprocket is fixedly mounted to the ball bearing assembly on an exterior surface thereof. The ball bearing assembly further having a female portion of a socket coupler. A male portion of the socket coupler is secured to the axle to rotate with the axle but is movable along the longitudinal axis of the axle. A control rod is provided for moving the male portion along the longitudinal axis of the axle into coupling relation with the female portion. A differential is mounted to the axle between the two wheels and a follower sprocket is mounted on an exterior surface of the differential. Finally, an endless chain connects the drive sprocket with the follower sprocket.

DESCRIPTION OF THE DRAWINGS

In order that the invention may be clearly understood and readily carried into effect, a preferred embodiment of the invention will now be described, by way of example only, with reference to the accompanying drawings wherein.

The file of this patent contains at least one drawing executed in color. Copies of this patent with color drawing(s) will be provided by the Patent and Trademark Office upon request and payment of the necessary fee.

DESCRIPTION OF A PREFERRED EMBODIMENT

Figure 1:
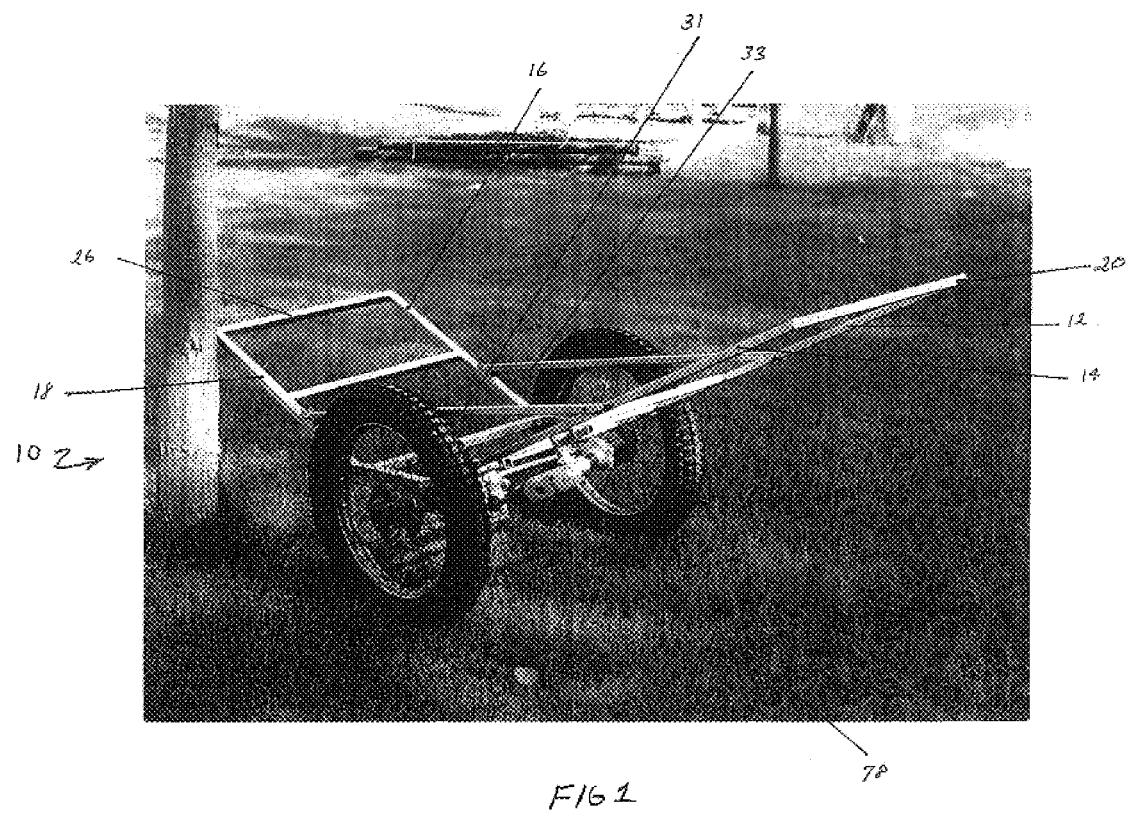
FIG. 1 is a perspective photograph showing the present invention.
Figure 3:
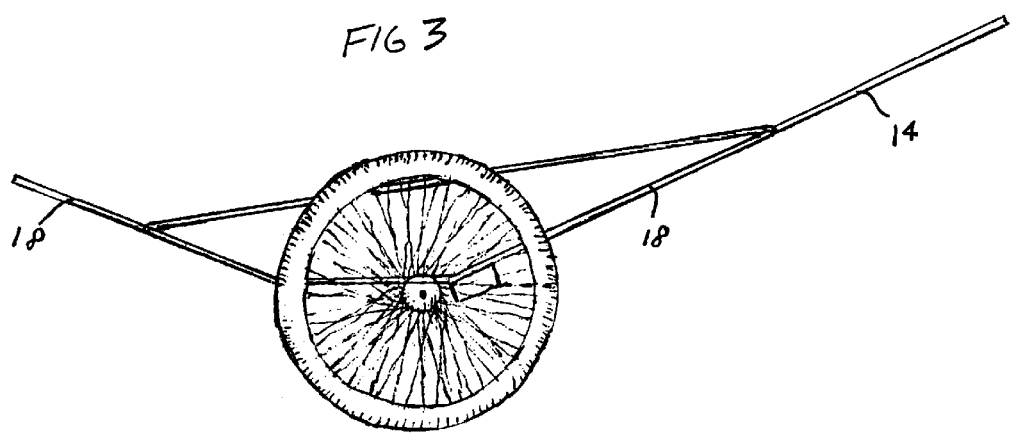
FIG. 3 is an elevational schematic view of the invention shown in FIG. 1.
Figure 2:
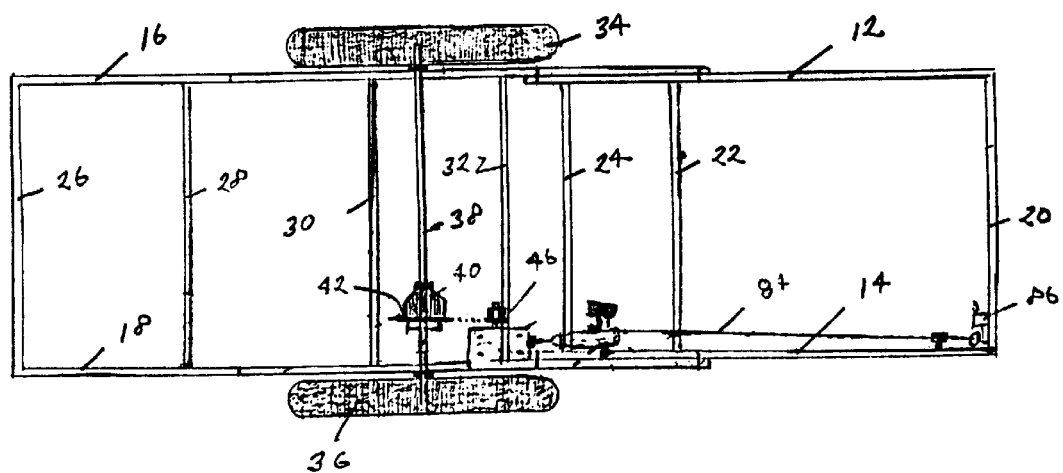
FIG. 2 is a top schematic view of the invention shown in FIG. 1.

A powered game cart according to the present invention is shown in FIGS. 1–4. The cart 10 includes a pair of spaced apart and parallel side members 12 and 14. Side member 12 is secured as by welding to a bent extension 16, as shown in FIG. 2, and side member 14 is secured as by welding to a bent extension 18, also as shown in FIG. 2.

Figure 4:
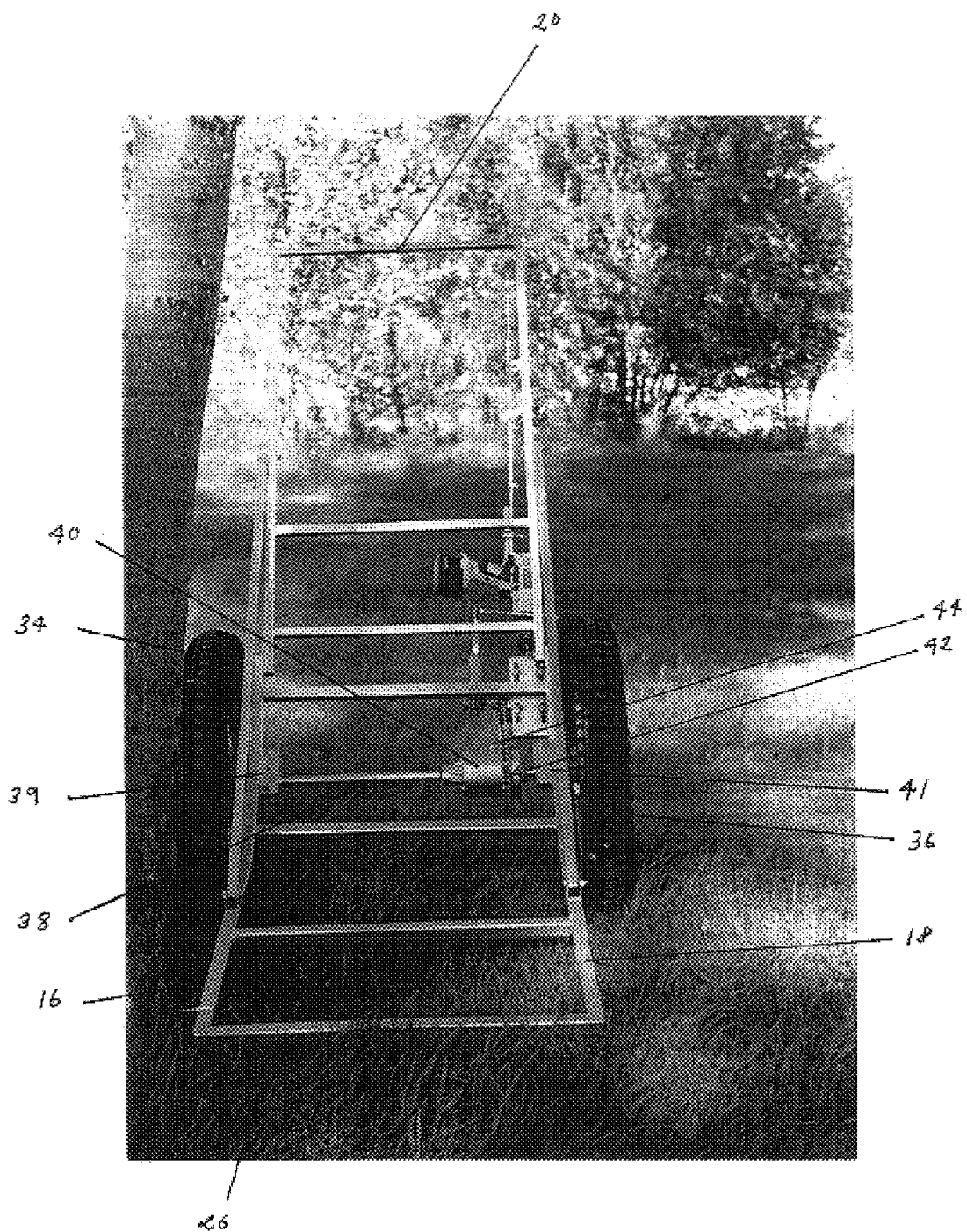
FIG. 4 is a perspective top view of the invention shown in FIG. 1.

End cross member 20 has each end secured as by welding to a respective free end of side members 12 and 14. A pair of spaced apart cross members 22 and 24 span between the cross members 12 and 14 and are secured thereto as by welding. An end cross member 26 is secured between extensions 16 and 18, as shown in FIG. 2. Cross members 28, 30 and 32 also span between extensions 16 and 18, and have their ends secured, as by welding, to extensions 16 and 18, as shown in FIGS. 2 and 4. A bracing member 31 is connected between side member 14 and extension 18, and a bracing member 33 is connected between side member 12 and extension 16, as shown in FIG. 1.

A pair of wheels 34 and 36 are fixedly secured to an axle 38. The end of axle 38 mounted to wheel 34 is mounted to the extension 16 with a pillow block bearing 39. The end of axle 38 mounted to wheel 36 is mounted to side extension 18 with a pillow block bearing 41, as shown in FIG. 4.

In a preferred embodiment, wheels 34 and 36 are spoke tires but other wheels or tires could be used as is well known in the art. A differential 40 is secured to axle 38 to permit wheels 34 and 36 to rotate at different speeds. A follower sprocket 42 is mounted to differential 40 whereby when follower sprocket 42 is rotated, the axle 38 is also rotated.

Figure 5:
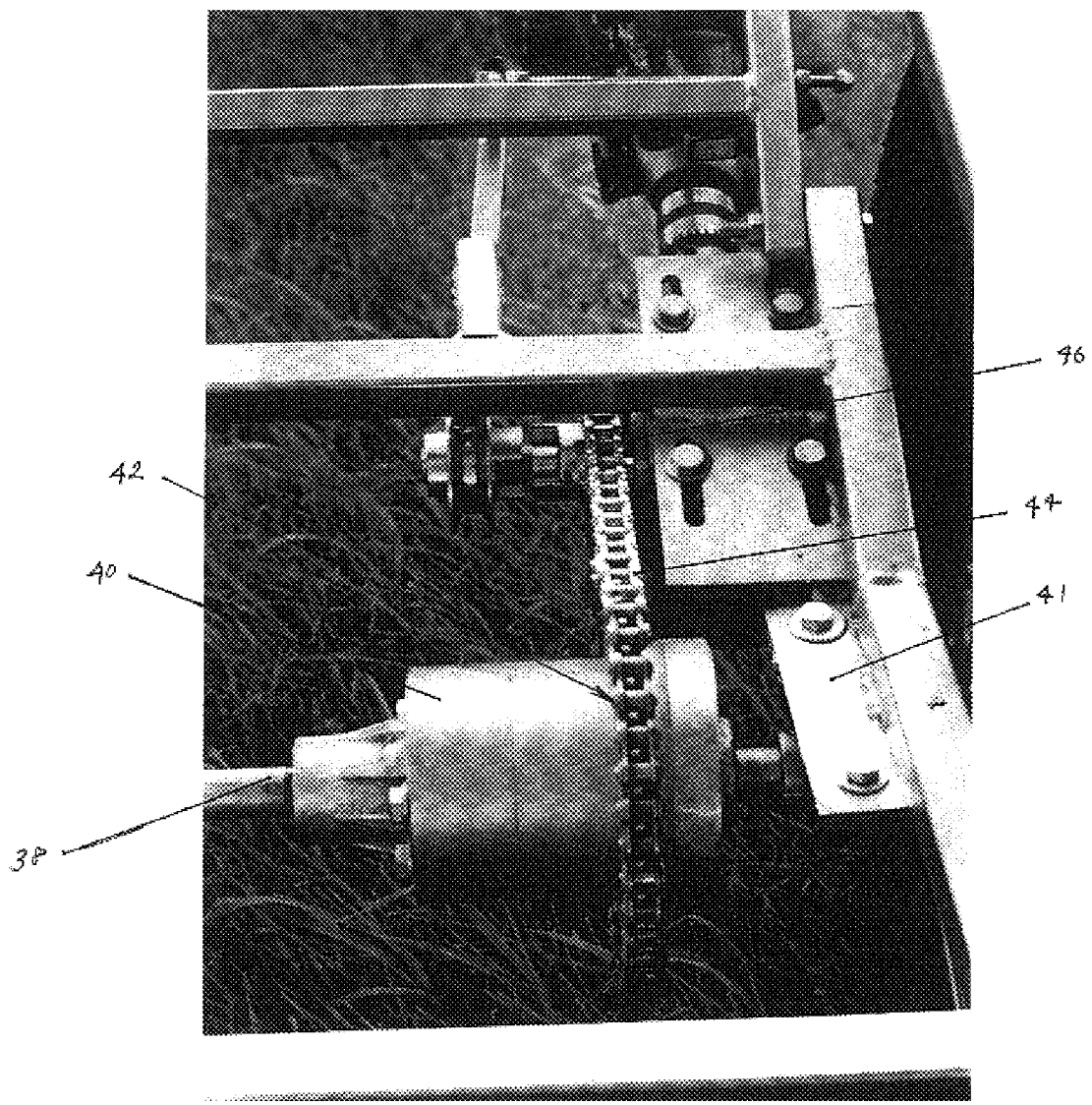
FIG. 5 is a perspective detail view of the drive system used with the invention shown in FIG. 1.

A drive chain 44 is wrapped around follower sprocket 42, as shown in FIG. 4. The drive chain 44 is also wrapped around a drive sprocket 46, as shown in FIGS. 5 and 6.

Figure 6:
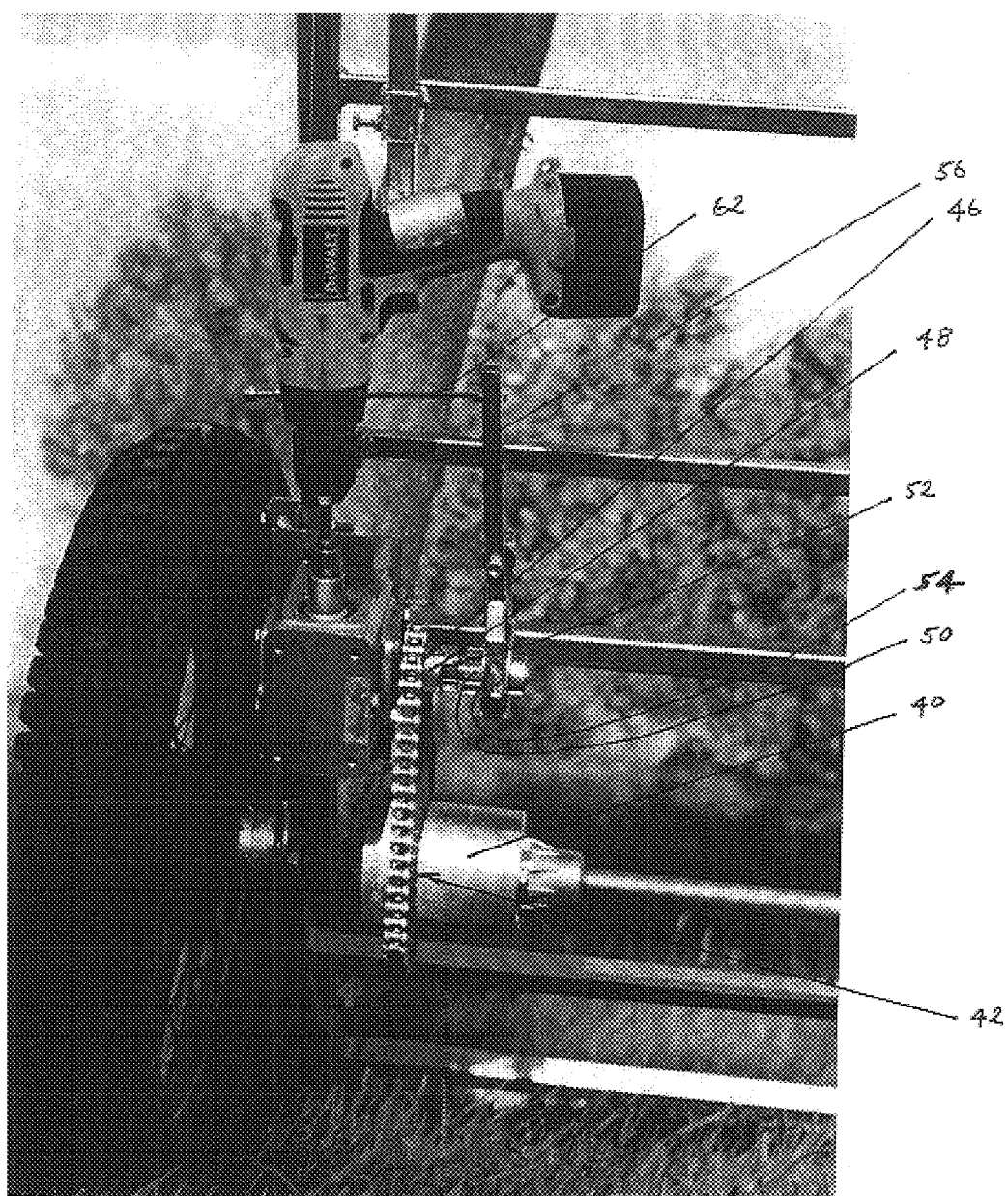
FIG. 6 is a further perspective detail view of the drive system used with the invention shown in FIG. 1.
Figure 7:
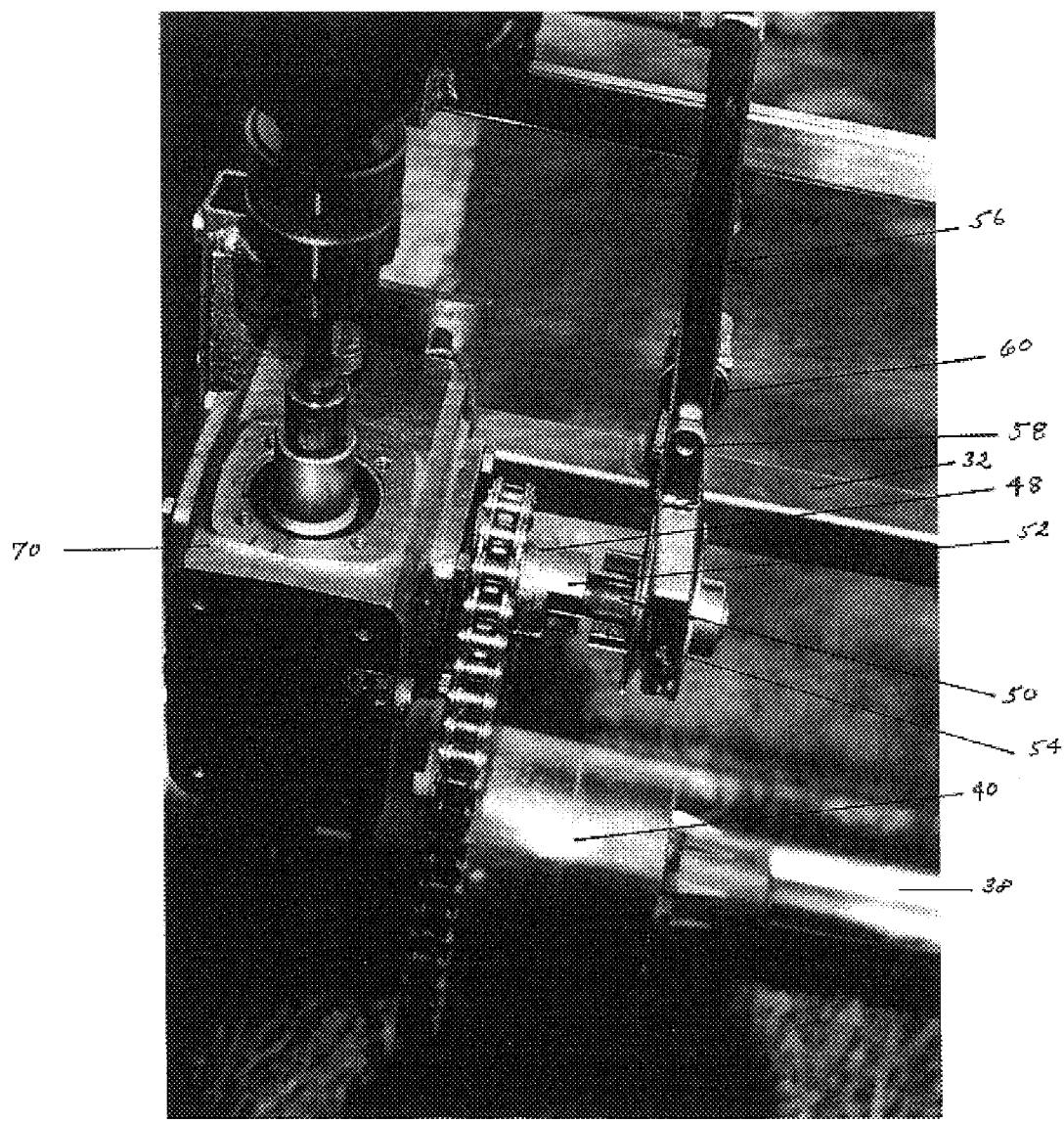
FIG. 7 is a perspective detail view of a socket coupler used with the present invention.

The drive sprocket 46 is fixedly secured to a high speed ball bearing 48, as shown in FIGS. 6 and 7. The high speed ball bearing 48 is rotatably mounted on a drive axle 50. The high speed ball bearing 48 allows the drive sprocket 46 to rotate freely on axle 50, but prevents the drive sprocket 46 from sliding longitudinally on axle 50. High speed ball bearing 48 is further provided with a female portion 52 of a socket coupler. This female portion 52 is sized to mate with a male portion 54 of the socket coupler. The male portion 54 is secured with axle 50 to rotate with axle 50, but is secured to axle 50 with a spline allowing the male portion 54 to move longitudinally with respect to drive axle 50. The male portion 54 of the socket coupler may be slid into engagement with the female portion 52, thereby joining the drive sprocket 46 with the drive axle 50. When the male portion 54 is moved to the right, as shown in FIG. 6, the socket coupler is uncoupled and the drive sprocket 46 freely rotates on drive axle 50.

A coupler engaging rod 56 has one end pivotally connected to the male portion 54 of the socket coupler, as shown in FIG. 7. At a position on coupler engaging rod 56 spaced apart from the pivotal connection with the male portion 54, the coupler engaging rod 56 is rotatably secured to a pin 58, which in turn is mounted to a mount 60 secured to cross member 32. By rotating coupler engaging rod 56 about pin 58, the male portion 54 of the socket coupler is moved out of engagement with the female portion 52 or into engagement with the female portion 52, depending upon the direction of rotation of coupler engaging rod 56 about pin 58.

Figure 8:
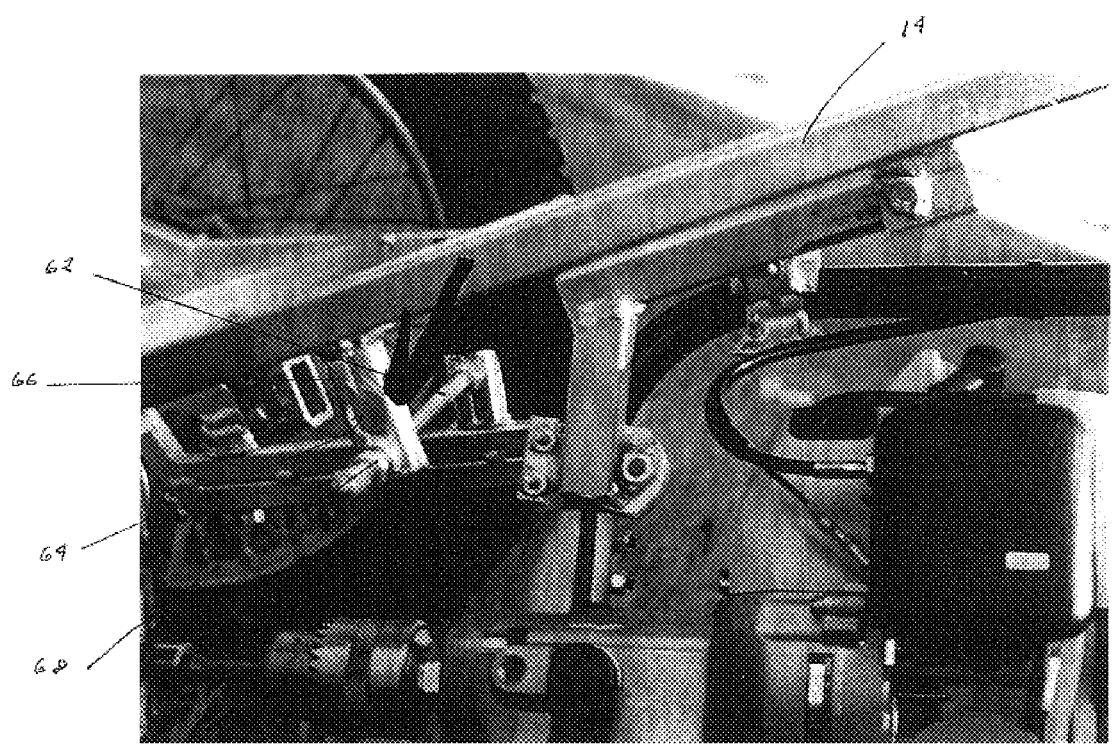
FIG. 8 is a perspective detail view of a handle used to manipulate the socket coupler shown in FIG. 7.

An engaging rod handle 62 is mounted to a free end of coupler engaging rod 56, as shown in FIG. 6. This handle 62 is inserted through an opening 64 provided in a stop mount 66, which in turn is secured as by welding to side member 14, as shown in FIG. 8. The opening 64 is further provided with a "V"-slot (not shown) and the rod and the handle 62 is provided with a stop 68, as shown in FIG. 8. The opening 64 is of sufficient diameter to allow stop 68 to slide therethrough. When the stop 64 is drawn through opening 64 and the handle slid down into the "V"-notch of opening 64, as shown in FIG. 8, the stop 68 is prevented from sliding through opening 64 by the "V"-notch of the mount 60. In this position, the coupler engaging rod 56 has been pivoted to couple the male and female portions 54 and 52 of the socket couplers. Therefore, in the secured and locked position, the male and female portions 54 and 52 are joined together, and the drive axle 50 drives the drive sprocket 46.

The drive axle 50 is an output axle of a Boston gear box 70, as shown in FIG. 7. The Boston gear box 70 is mounted to the side extension 18 with a mounting plate 72. In a preferred embodiment, the mounting plate 72 is mounted to the side extension 18, and the mounting plate 72 is provided with four slots 74. Four bolts 76 extend through the slots 74 and are screwed into the Boston gear box 70. The slots 74 are provided to allow the drive sprocket 46 to be moved either toward or away from follower sprocket 42 to adjust the tension of the drive chain 44 on the two sprockets 42 and 46.

Figure 9:
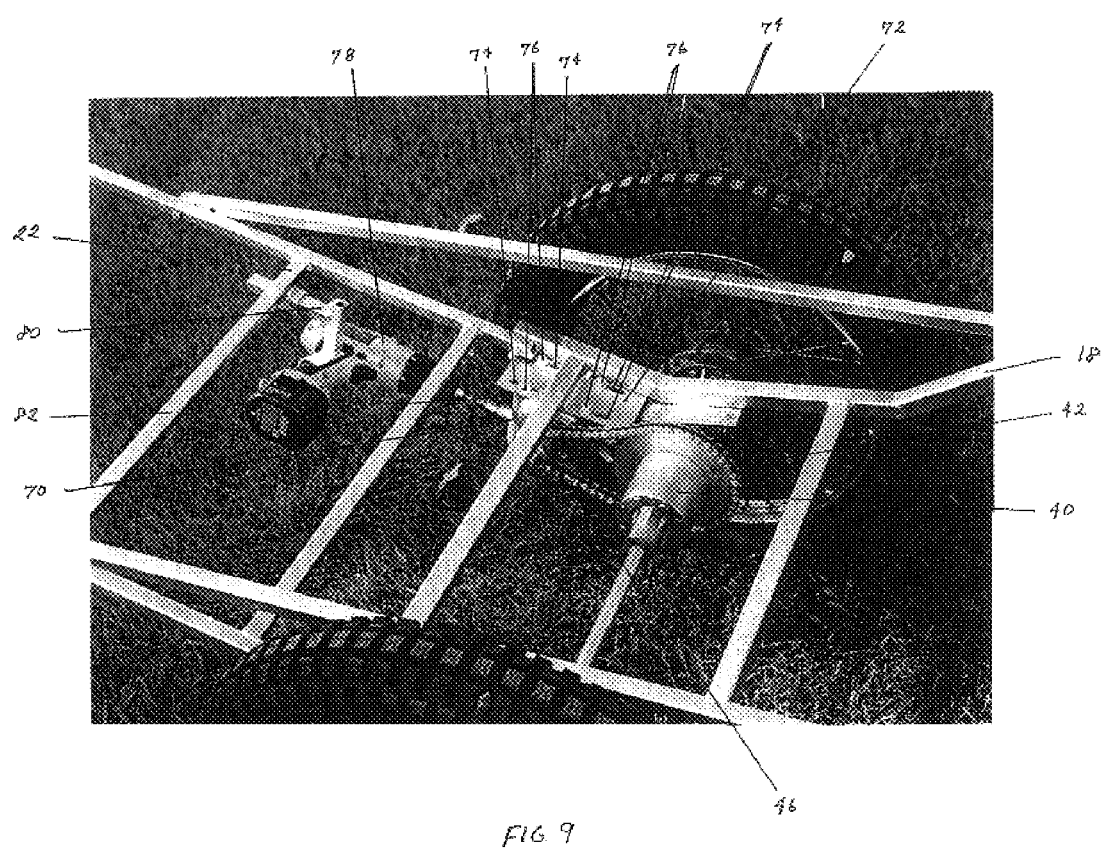
FIG. 9 is a perspective detail view of the drive system used with the invention shown in FIG. 1.

A variable speed power drill 78 is provided for powering the cart. This power drill is mounted to the cross member 22 with a conventional adjustable mount 80, as shown in FIG. 9. The power drill 78 is chucked to a spindle 82 which drives the input spindle of the Boston gear box 70. The output of gear box 70 is connected to drive axle 50. With this arrangement, when the power drill is operating, the power drill rotates spindle 82 which, through the Boston gear box 70, rotates the drive axle 50.

Figure 10:
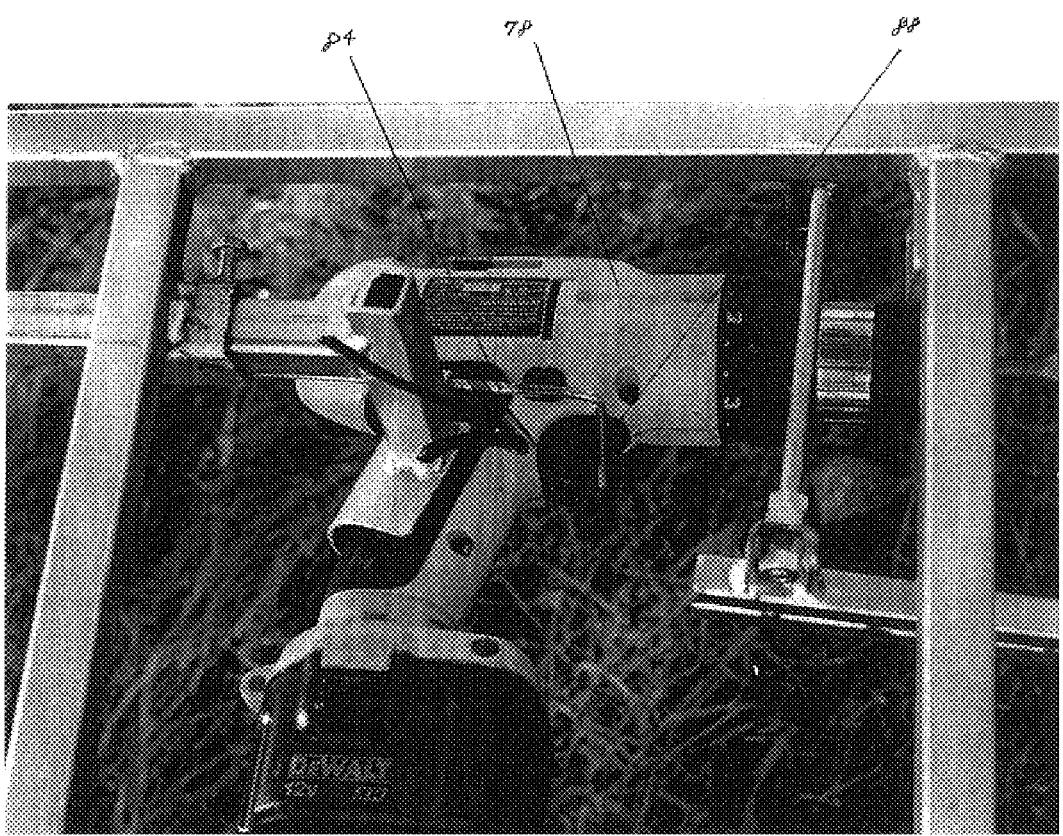
FIG. 10 is a perspective detail view of a control mechanism for actuating a trigger of a power drill used with the present invention.

A throttle control rod 84, as shown in FIG. 2, is provided with a control handle 86 mounted to end cross member 20. By pulling on throttle control rod 84, a catch member 88, as shown in FIG. 10, squeezes a trigger of the power drill 78 thereby turning the spindle 82. When the throttle control rod 84 is pushed forwardly, the catch member 88 releases the trigger and the power drill stops. Further, the speed of the variable power drill 78 is controlled by the degree the control rod 84 is pulled outwardly.

Although a preferred embodiment was shown with a battery-powered power drill, it should also be understood that a gas operated drill could also be used equally as well.

A powered game cart has been shown and described, which cart can be used for moving game out of the wilderness with ease. The game cart is powered with a power drill, and when the power drill is actuated, the wheels 54 and 56 of the cart are driven in a forward direction. The differential 40 allows the cart to move easily around turns and corners. When it is desired to move the cart freely and not under power control, the socket couplers 52 and 54 are disengaged, and the axle 28 rotates freely.

While the fundamental novel features of the invention have been shown and described, it should be understood that various substitutions, modifications, and variations may be made by those skilled in the art, without departing from the spirit or scope of the invention. Accordingly, all such modifications or variations are included in the scope of the invention as defined by the following claims:

I claim:

1. A motorized game cart comprising:

a frame;

an axle with a longitudinal axis;

a pair of wheels secured to opposite ends of the axle;

a pair of pillow block bearings mounted to the frame on opposite sides of the frame with the axle adjacent each wheel extending through a respective pillow block bearing;

a portable power drill mounted to the frame, the power drill having a chuck;

a gear box mounted to the frame having an input assembly;

the power drill connected to the input assembly with the chuck;

the gear box further having an output assembly fixedly connected to the axle for rotating the axle when the power drill is operating;

a ball bearing assembly rotatably mounted on the axle for free rotation about the axle;

a drive sprocket fixedly mounted to the ball bearing assembly on an exterior surface thereof;

a socket coupler having a female portion and a male portion;

the female portion of the socket coupler fixedly connected to the ball bearing assembly;

means for securing the male portion of the socket coupler to the axle so that the male portion will rotate with the axle and also slidably move along the longitudinal axis of the axle;

a control rod for moving the male portion along the longitudinal axis of the axle into coupling relation with the female portion;

a differential is fixedly mounted on the axle between the two wheels whereby the differential rotates with the axle;

a follower sprocket mounted on an exterior surface of the differential; and an endless chain connecting the drive sprocket with the follower sprocket.

2. The motorized game cart according to claim 1 wherein the power drill comprises a variable speed power drill and includes a trigger for operating the power drill and further including a control rod means for squeezing the trigger of the power drill.

* * * * *